United States Patent
Bae et al.

(10) Patent No.: US 11,348,307 B2
(45) Date of Patent: May 31, 2022

(54) METHOD AND DEVICE FOR PROCESSING CONTENT

(71) Applicant: Samsung Electronics Co., Ltd., Suwon-si (KR)

(72) Inventors: Jaehyeon Bae, Suwon-si (KR); Youngwan So, Suwon-si (KR); Hyunkoo Yang, Suwon-si (KR); Eric Yip, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/256,505

(22) PCT Filed: Jul. 9, 2019

(86) PCT No.: PCT/KR2019/008414
§ 371 (c)(1),
(2) Date: Dec. 28, 2020

(87) PCT Pub. No.: WO2020/013567
PCT Pub. Date: Jan. 16, 2020

(65) Prior Publication Data
US 2021/0279945 A1    Sep. 9, 2021

(30) Foreign Application Priority Data
Jul. 10, 2018 (KR) .................. 10-2018-0080241

(51) Int. Cl.
*G06T 15/20* (2011.01)
*G06T 11/00* (2006.01)
*G06F 3/0346* (2013.01)

(52) U.S. Cl.
CPC .......... *G06T 15/20* (2013.01); *G06F 3/0346* (2013.01); *G06T 11/00* (2013.01); *G06T 2200/16* (2013.01); *G06T 2210/36* (2013.01)

(58) Field of Classification Search
None
See application file for complete search history.

(56) References Cited

U.S. PATENT DOCUMENTS 10,775,878 B2    9/2020  Stafford et al.
2011/0202149 A1*  8/2011  Baier .................. G06Q 10/06
                                                                      700/83

(Continued)

FOREIGN PATENT DOCUMENTS

JP    2018-515972 A    6/2018
KR   10-2016-0104022 A  9/2016

OTHER PUBLICATIONS

Kyungmo Park et al., "Use cases and requirements for NBMP (v4)", MPEG2018/N17502, The 122nd ISO/IEC JTC 1/SC 29/WG 11 (MPEG) Meeting, Apr. 16-20, 2018, San Diego, US.

(Continued)

*Primary Examiner* — Michelle Chin
(74) *Attorney, Agent, or Firm* — Jefferson IP Law, LLP

(57) ABSTRACT

According to an embodiment of the present disclosure, there is provided a method of receiving a multimedia service, in which, by using user feedback information in a large-volume 6 degrees of freedom (6DoF) media transmission service using network-based media processing (NBMP), it is possible to reduce network traffic through efficient media transmission and a burden of rendering media content on a terminal. According to an embodiment of the present disclosure, a method of processing content includes receiving content regarding an object in a three-dimensional (3D) space, the content including media data and metadata, performing pre-rendering on the media data based on user information, and outputting pre-rendered data.

14 Claims, 12 Drawing Sheets

(56) References Cited

U.S. PATENT DOCUMENTS

| | | | |
|---|---|---|---|
| 2016/0219325 A1 | 7/2016 | Chu et al. | |
| 2017/0004648 A1 | 1/2017 | Li | |
| 2018/0165876 A1 | 6/2018 | Heinz, II et al. | |
| 2018/0192471 A1 | 7/2018 | Li et al. | |
| 2019/0371051 A1* | 12/2019 | Dore | G06T 7/90 |
| 2019/0379876 A1* | 12/2019 | Hur | H04N 21/4884 |
| 2020/0226792 A1* | 7/2020 | Wang | H04N 19/597 |
| 2020/0252688 A1 | 8/2020 | Lam et al. | |

OTHER PUBLICATIONS

International Search report dated Oct. 15, 2019, issued in International Application No. PCT/KR2019/008414.
SK Telecom, Park, XP030071123, "The proposed update requirements of NBMP", Apr. 2018, San Diego, US.
Mekuria et al., XP055548820, Design Implementation, and Evaluation of a Point Cloud Codec for Tele-Immersive Video, Apr. 2017.
Extended European Search Report dated Apr. 23, 2021, issued in European Patent Application No. 19834179.4.
European Office Action dated Apr. 19, 2022, issued in European Patent Application No. 19 834 179.4.

\* cited by examiner

METHOD AND DEVICE FOR PROCESSING CONTENT

TECHNICAL FIELD

The present disclosure relates to a method and device for transmitting content. More specifically, the present disclosure relates to a method and device for processing and transmitting 6 degrees of freedom (6DoF) multimedia content using network-based media processing (NBMP) for media-optimized transmission.

BACKGROUND ART

Six (6) degrees of freedom (6DoF) may include left/right rotation (roll) on an x-axis, forward/backward rotation (pitch) on a y-axis, up/down rotation (yaw) on a z-axis, forward/backward motion (surge), left/right motion (sway), and up/down translational motion (heave).

Attention has been increasing on 6DoF content that may be consumed by a user in a desired direction by generating information about a player or an object in a virtual space with multiple cameras in a studio or sports stadium. For example, for a technique for generating and providing a new form of content in a virtual space by using 38 5K cameras, to transmit corresponding information, three-dimensional (3D) space information and color information have to be transmitted, requiring transmission of a larger volume of media than transmission of an existing two-dimensional (2D) form of an image.

Thus, the Moving Picture Experts Group (MPEG) is discussing a scheme to store a new form of 3D media, referred to as point cloud compression (PCC), for transmission and storage of 3D media. However, even in transmission using PCC, a significant amount of data is needed for transmission of 3D media over a network and much computation is required for a terminal to play 3D media.

DESCRIPTION OF EMBODIMENTS

Technical Problem

There is a need for a technique for efficiently using a network resource and extending a service to various terminals in transmission of a large amount of content.

Solution to Problem

The present disclosure provides efficient use of a network resource and service extension to various terminals by processing high-volume 6DoF content using network-based media processing and transmitting the processed 6DoF content to a terminal.

The present disclosure provides a method in which a server processes 6DoF content to optimize the 6DoF content appropriately for information about a terminal and/or a network state when the server transmits the 6DoF content to the terminal.

The present disclosure provides a method and device in which a device or server in a network stage generates 6DoF content and transmits the 6DoF content together with related metadata when network-based media processing (NBMP) is used in the network stage.

The present disclosure provides a method and device for generating content by using information about a user and transmitting the content when a device or server in a network stage or a 6DoF content server generates 6DoF content.

Advantageous Effects of Disclosure

A method may be provided in which a server present in a network optimizes 6DoF content appropriately for information about a terminal and a network state, when the 6DoF content is transmitted from the server to the terminal.

BEST MODE

Figure 1:
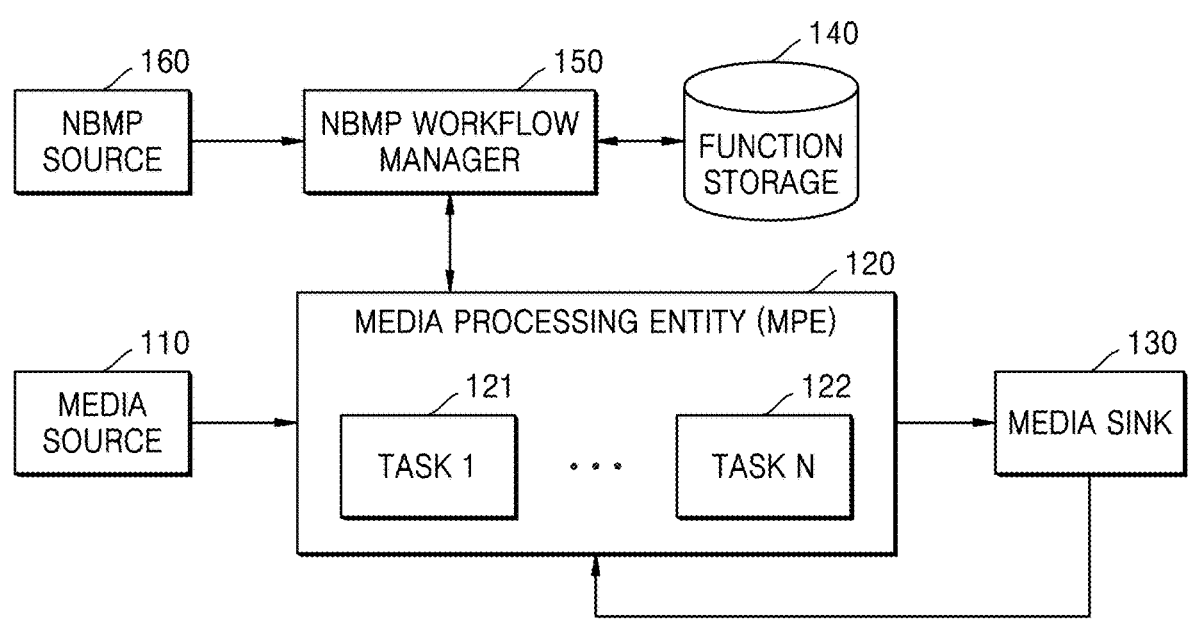
FIG. 1 illustrates an architecture based on general network-based media processing (NBMP)

A method of processing content according to an embodiment of the present disclosure includes receiving content regarding an object in a three-dimensional (3D) space, the content including media data and metadata, performing pre-rendering on the media data based on user information, and outputting pre-rendered data.

MODE OF DISCLOSURE

Hereinafter, the operating principles of exemplary embodiments of the present disclosure will be described with reference to the accompanying drawings. Like components are referred to as like reference numerals even through being illustrated in different drawings, and in the following description, a detailed description of related well-known functions or configurations will not be provided if it unnecessarily obscures the subject matter of the present disclosure. The terms as used herein are defined considering the functions in the disclosure and may be replaced with other terms according to the intention or practice of the user or operator. Therefore, the terms should be defined based on the overall disclosure.

An embodiment of the present disclosure may be constructed as below.

Six (6) degrees of freedom (6DoF) content may refer to content including media data which includes location information of an object in a virtual three-dimensional (3D) space or a real 3D space, color information of points indicating the object, and additional information for expressing the points. The 6DoF content may include the media data and metadata. The media data may include information for expressing an object in a 3D domain, such as geometry data, texture data, material data, etc. The metadata may include information that describes an object, such as scene description, and expresses a 3D space related to the object.

A 6DoF camera or content server may generate or store 6DoF content including 6DoF media data and metadata by using several methods. A representative 6DoF content generation method may be described as below.

For example, point cloud compression (PCC) that transmits media data information by using moving images may project an object onto a virtual plane every unit times to generate 2D images and temporally store consecutive images in the form of a moving image. PCC may include a process of separately generating fetch video including color information about each point projected onto the plane and depth video including location information of the projected point. PCC may include a process of compressing information about the fetch video and the depth video by using an existing video encoder. PCC may also include a process of generating additional information (e.g., scene description, occupancy info., etc.) for expressing the fetch video and the depth video in a virtual space.

In another example, there may be a method of expressing location information or color information of the object in a binary form or an American standard code for information interchange (ASCII) form and storing or transmitting 6DoF content in a file of a form such as ply, obj, etc. In another example, 6DoF content may include geometry information that is geometrical information of each of points indicating an object in a 3D space, red/green/blue (RGB) information that is color information of a corresponding point, material information indicating a face formed by connecting the points of the object, texture information including location information of the object and information of a relation with a surrounding environment, and so forth. The 6DoF content may be generated and stored based on the above-described information.

When the 6DoF content generated in the foregoing manner is transmitted, media data indicating a location, a color, etc., of each of points constituting an object and metadata expressing connection information between points, a size of a space, location information of the object, etc., have to be transmitted together.

Hereinafter, the disclosure will be described with reference to the accompanying drawings.

FIG. 1 illustrates an architecture based on general network-based media processing (NBMP).

An NBMP system may refer to a system for processing media through one or more processing entities in a network. The NBMP system may include a media source 110, an NBMP source 160, an NBMP workflow manager 150, a function storage 140, a media processing entity (MPE) 120, and a media sink 130.

The media source 110 may be an entity that provides raw media content to be processed. The media source 110 may be, for example, a digital camera, a microphone, a server, an encoder, etc.

The NBMP source 160 may be an entity that describes a media processing process in a network. An NBMP workflow may mean a graph of one or more connected tasks that perform requested media processing. The NBMP workflow manager 150 may be an entity that provides tasks and connect the tasks to generate a complete NBMP workflow based on a workflow description.

The function storage 140 may be a storage from which NBMP functions are obtained by the NBMP workflow manager 150 or the NBMP source 160. The media processing entity 120 may be an entity that executes one or more media processing tasks. The media sink 130 may be an entity that consumes output of an NBMP workflow through existing transmission methods.

The NBMP system may describe a workflow by constructing a set of media processing functions accessible through an NBMP application programming interface (API).

The media processing entity 120 may include processing tasks 121 and 122 that are applied to media data and related metadata received from the media source 110 or other media processing entities. The media processing entity 120 may provide a control function of configuring and managing the processing tasks 121 and 122.

The media processing task 121 may generate media data and related metadata to be consumed by the media sink 130 or another media processing task 122.

The NBMP framework illustrated in FIG. 1 may support any form of media content including existing Moving Picture Experts Group (MPEG) codecs and MPEG formats such as the International Organization for Standardization (ISO)/the International Electrotechnical Commission (IEC) 13818-1, the ISO/IEC 14496-12, the ISO/IEC 23008-1, and the ISO/IEC 23009-1. The NBMP framework may support delivery through an Internet protocol (IP)-based network using common transport protocols (e.g., a transmission control protocol (TCP), a user datagram protocol (UDP), a real-time transport protocol (RTP), and a hypertext transfer protocol (HTTP)).

NBMP may specify an interface for making and controlling a media processing workflow of a network. NBMP may be divided into a control plane and a media plane. The control plane may include a workflow API, a function discovery API, and a task API.

The workflow API may be used for the NBMP source 160 to make and control the media processing workflow. The function discovery API may provide a means used by the workflow manager 150 and/or the NBMP source 160 to search for a media processing function that may be loaded as a part of the media processing workflow. The task API may be used by the workflow manager 150 to configure a task in a runtime and monitor the task.

The NBMP system may define not only a media format, metadata, and an additional information format between the NBMP tasks 121 and 122, but also a media format, metadata, and an additional information format between the NBMP source 160 and the tasks 121 and 122.

Figure 2:
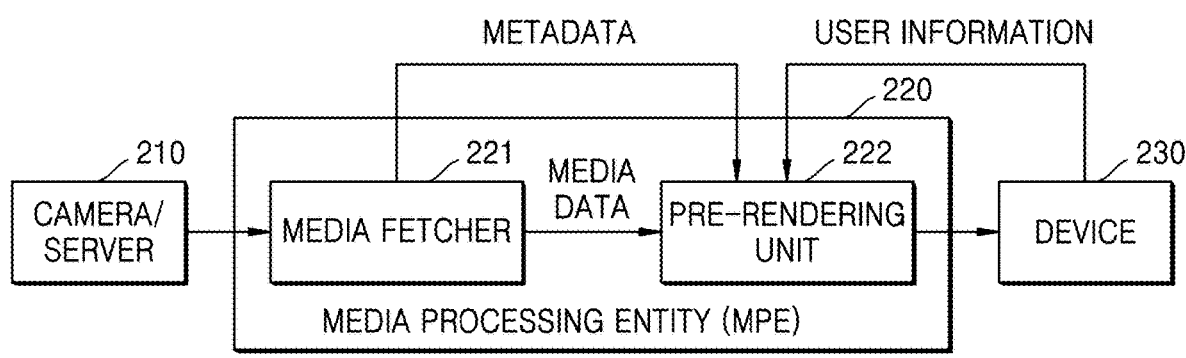
FIG. 2 is a view for describing a system using NBMP, according to an embodiment of the present disclosure.

FIG. 2 is a view for describing a media processing system using NBMP, according to an embodiment of the present disclosure.

A camera or content server 210 may transmit 6DoF content to a media processing entity 220 that performs NBMP. When an NBMP system receives the 6DoF content, the NBMP system may separate the 6DoF content into 6DoF media data and 6DoF metadata that is related to the media content by using a media content fetcher 221.

A pre-rendering unit 222 of the media processing entity 220 may perform pre-rendering on 6DoF media content by using the metadata related to the media data. The pre-rendering unit 222 may transmit partial content corresponding to a user's viewpoint or partial content displayed through a user terminal device 230, by using user information (user Info.), when the pre-rendering unit 222 performs pre-rendering on the 6DoF content. The user information may be transmitted in the form of metadata regarding a service user to the media processing entity 220 from the user terminal device 230.

According to an embodiment of the present disclosure, by using state information of the service user and/or network state information for NBMP, a service provider may reduce the size of overall 6DoF data transmitted to the user terminal through the network. As the size of overall 6DoF data transmitted to the user terminal through the network is reduced, a performance burden of the user terminal generated in data reception or rendering may be reduced.

The user terminal device 230 according to an embodiment of the present disclosure may include, but not limited to, a smart phone, a wearable device, a tablet personal computer (PC), a PC, a smart television (TV), a personal digital assistant (PDA), a laptop, a media player, a micro server, a global positioning system (GPS) device, an electronic book (e-book) terminal, a digital broadcasting terminal, a navigation system, an MP3 player, a digital camera, and so forth. The user terminal device 230 may be a mobile computing device other than the aforementioned devices or a non-mobile computing device.

In the user terminal device 230 supporting multimedia communication, an interface for receiving and transmitting data and multimedia may be installed. To input and output audio, a microphone, a speaker, and a codec for encoding/decoding an audio signal are required. To input and output a still image and a moving image, a camera, a display, and a codec for encoding/decoding the still image and the moving image are required.

The user terminal device 230 according to an embodiment of the present disclosure may include a receiver for receiving a signal, a processor for processing the received signal, a communicator for transmitting the processed signal, and an outputter for outputting the processed signal. The user terminal device 230 according to an embodiment of the present disclosure may further include a user inputter and a memory.

Figure 3:
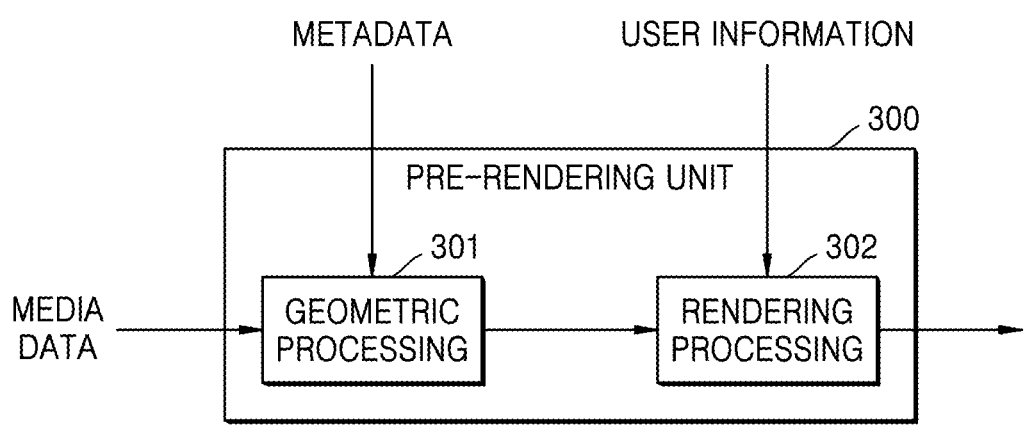
FIG. 3 is a view for describing a method of using media data, metadata, and user metadata in a pre-rendering process, according to an embodiment of the present disclosure.

FIG. 3 is a view for describing a method, performed by a pre-rendering unit of a media processing entity, of using media data, metadata, and user metadata in a pre-rendering process, according to an embodiment of the present disclosure. A pre-rendering unit 300 of FIG. 3 may correspond to the pre-rendering unit 222 of FIG. 2, and a redundant description will be avoided.

The media fetcher 221 of FIG. 2 may separate 6DoF content received by the server 220 having an NBMP function through the camera or content server 210 into 6DoF media data and metadata related to the 6DoF media data. The pre-rendering unit 222 may perform pre-rendering on the 6DoF media content by using the meta data related to the media data.

A pre-rendering media processing entity 300 in the NBMP system corresponding to the pre-rendering unit 222 of FIG. 2 may perform a geometric processing process 301 for expressing an object in a virtual space by using the media data and the metadata. To express an object in a virtual space or a real space, metadata for mapping a point of the object to the virtual space as well as information related to points in the 6DoF media data may be used. The metadata may include space metadata, reconstruction type information, scene description information, etc.

The media processing entity according to an embodiment of the present disclosure may receive an intention of a content manufacturer or content generation information as the space metadata or the scene description information when the media processing entity expresses a 3D space. For example, the space metadata may include at least one of information about the 3D space, reference information regarding the space, or information about a location of an object or a camera.

The reconstruction type information may include information indicating whether streams have a correlation with one another or have no correlation and/or configuration information of each stream (or a 3D object), when the object is expressed in various levels of detail (LoD).

For example, when streams have a correlation with one another, the media processing entity may transmit information about an object in three streams. In this case, the object may be expressed in a 3D space when all the three streams are received. In another example, when streams have no correlation, the first stream may be data expressing an object at a low quality, the second stream may be data expressing an object at a medium quality, and the third stream may be data expressing an object at a high quality. The media processing entity according to an embodiment of the present disclosure may receive configuration information of a stream (or a 3D object) as the reconstruction type information in a manifest form or another agreed form to allow a terminal to receive and render data.

The scene description information may include information about how the 3D object is to be expressed or which effect is to be applied in the 3D space.

For example, the media processing entity according to an embodiment of the present disclosure may receive, as information about a space, space metadata, reconstruction type information (e.g., information about a correlation between two data pieces when geometry data and texture data are separately output in a projection process), and scene description information (e.g., a correlation with light in expression of an object in the space, an influence of light upon the object, etc.), which are separately defined. However, in another example, the media processing entity may receive the space metadata, the reconstruction type information, the scene description information, etc., in the form of one scene description information piece.

A result of the geometric processing process 301 may be 3D geometric data expressing the object in the virtual space, and the 3D geometric data may be delivered to a rendering processing process 302. The rendering processing process 302 may include a process of specifying a region expressed by a user's 2D display before processing 3D geometric information. To specify the region expressed by the user's 2D display, user-related metadata transmitted from a user terminal may be used.

User viewpoint related information corresponding to a user-selected viewpoint in the virtual space (user_view_location, user_view_direction, and user_view_field_of_view (FoV)), user display related information (user_display_resoution, etc.), user terminal related information, user device capacity related information (user_device_buffersize and user_device_codec), etc., may be received from the user terminal for use in the rendering processing process 302.

The pre-rendering unit 300 according to an embodiment may receive media data and metadata of 6DoF content and receive a user-selected viewpoint and/or a terminal's environment from the user terminal before transmitting the received information to the user terminal. The pre-rendering unit 300 according to an embodiment may reduce the size of overall data transmitted to the user terminal and a performance burden of the terminal by performing pre-rendering on media data based on the information received from the user terminal.

TABLE 1

```
{
"name":"6DoF metadata",
"input":{
"media-description":[
{
"media-stream-id":"1",
"media-type":"text",
"media-title" : Space Meta Data.
{ object_reference_locaton,
Reference_space_size,
Transformation_matrix,
...
}
"media-stream-id":"2",
"media-type":"text",
"media-title" : reconstruction type.
{ primitive_assembly_type,
...
}
}
}
}
}
```

Table 1 shows an example of 6DoF metadata used in pre-rendering.

TABLE 2

```
{
"name":"user feedback information metadata",
"input":{
"media-description":[
{
"media-stream-id":"1",
"media-type":"text",
"media-title" : user device capability.
{ user_dev_buffersize,
user_dev_encoder_type,
...
}
"media-stream-id":"2",
"media-type":"text",
"media-title" : user view information.
{ user_view_location,
user_view_direction,
user_view_FOV,
...
}
"media-stream-id":"3",
"media-type":"text",
"media-title" : user display information.
{ user_disp_resolution,
user_disp_size
...
}
}
}
}
}
```

Table 2 shows an example of user metadata used in pre-rendering.

As in an embodiment illustrated in FIG. 3, when the pre-rendering media processing entity 300 in the NBMP system pre-renders 6DoF content, a related manifest file also has to be updated and transmitted to the terminal. The manifest file may include information for physically searching for or discovering each object or a part thereof in media data and information about a data format for expressing the object. For example, when the media processing entity in the NBMP system transmits 6DoF or 3D animation by using PCC streaming of the MPEG or ply file transmission using binaries, additional information about a relation between media data and an expression method (e.g., scene description, occupancy info., etc.) as well as media data including geometric information for expressing an object, color information, etc., may also be transmitted to the terminal.

When information of the manifest file is changed through pre-rendering, the updated manifest file may be transmitted to the terminal. For example, a form of 6DoF content may be changed into a 2D image form through a pre-rendering process of NBMP. Alternatively, the form of the 6DoF content may be changed into a partial transmission form (e.g., partial content corresponding to a user's viewpoint are transmitted through culling, etc.). When the form of the 6DoF content is changed, a process of transmitting a changed attribute to the terminal may be required for media processing in the terminal.

Depending on an implementation scheme, media data of the 6DoF content may include a plurality of streams that are independently processable based on a user's viewpoint, etc. In this case, the pre-rendering unit 300 may skip the geometric processing process 301, and select media data appropriate for the user's viewpoint and transmit the selected media data to the terminal.

Figure 4:
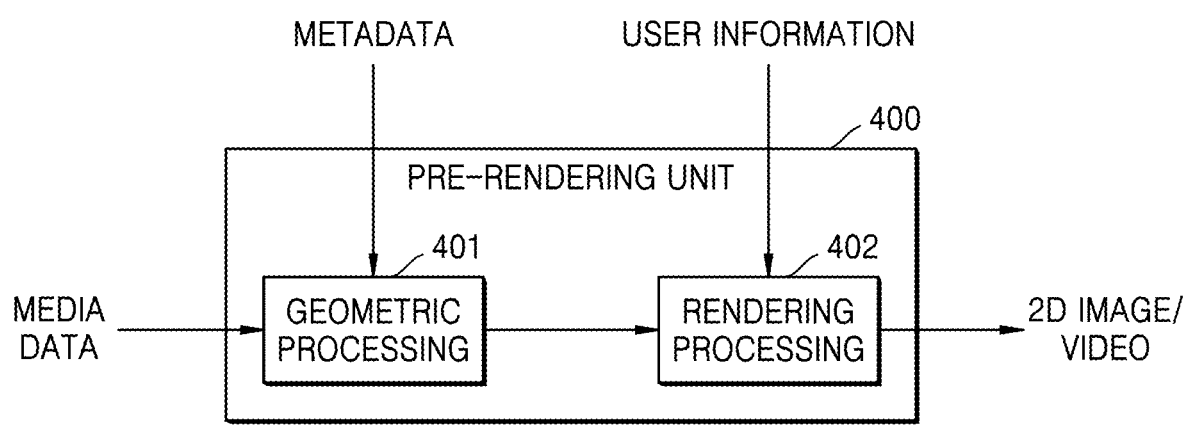
FIG. 4 is a view for describing a method of pre-rendering entire 6 degrees of freedom (6DoF) content by using NBMP, according to an embodiment of the present disclosure.

Hereinbelow, a detailed embodiment will be described to reduce the size or complexity of content by pre-rendering of the media processing entity with respect to the 6DoF content through NBMP. FIG. 4 is a view for describing a method of pre-rendering the entire 6DoF content by using NBMP, according to an embodiment of the present disclosure.

A pre-rendering unit 400 of FIG. 4 may correspond to the pre-rendering unit 222 of FIG. 2, and a redundant description will be avoided. As shown in FIG. 4, the pre-rendering unit 400 according to an embodiment of the present disclosure may output content in a 2D form by remotely rendering the entire 6DoF content.

As the entire 6DoF content go through a geometric processing process 401 that generates an object in a virtual space in a network stage, information about an object in the virtual space may be generated. Based on information generated through the geometric processing process 401 and user's feedback information (user info.), a rendering process 402 may be performed on partial content of the entire 6DoF content, which corresponds to the user's viewpoint. The user's feedback information (user info.) may include information about user's location and/or direction in the virtual space. Rendered content in the 2D form may be transmitted to the user terminal. The user terminal may play the 6DoF content divided based on the user feedback information by receiving the rendered content in the 2D form. The rendered content in the 2D form may go through an additional encoding process or may be transmitted in the form of original data to the terminal.

Figure 5A:
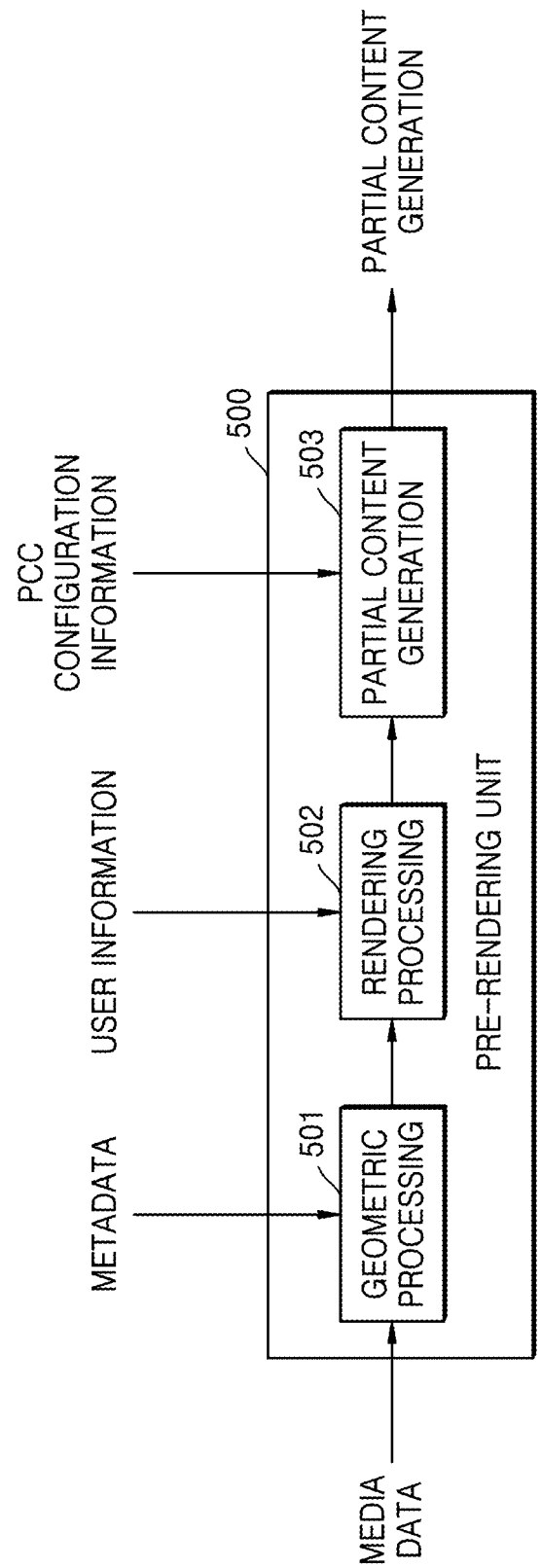
FIG. 5A is a view for describing a method of generating partial content based on content projection in transmission of 6DoF in the form of point cloud compression (PCC) streaming, according to an embodiment of the present disclosure.

FIG. 5A is a view for describing a method of generating partial content based on content projection in transmission of 6DoF in the form of PCC streaming, according to an embodiment of the present disclosure. A pre-rendering unit 500 of FIG. 5A may correspond to the pre-rendering unit 222 of FIG. 2, and a redundant description will be avoided.

A scheme to store 6DoF content using PCC is a scheme to store information about colors of points indicating an object and information about locations of the points by projecting the object onto a virtual rectangular parallelepiped plane surrounding the object.

In a general PCC storage scheme, all information about a color and a location of an object, generated based on each plane, is transmitted in one file. However, in NBMP, by using user viewpoint information (user_view_location, user_view_direction, user_view_FOV) in user feedback information, information (fetch video and depth video) about a plane corresponding to the user's viewpoint and additional information (scene description) related to the information about the plane may be extracted and transmitted. Thus, the size of data transmitted through the network and a load of the user terminal in content rendering may be reduced.

For example, the pre-rendering unit 500 of FIG. 5A may render an object in a 3D form in the virtual space through geometric processing 501 and rendering processing 502. The pre-rendering unit 500 may transmit a rendering result from the rendering processing 502 to partial content generation 503. The pre-rendering unit 500 may generate the object in the 3D form in a divided manner based on the user's viewpoint (user_view_location, user_view_direction, etc.) in the rendered virtual space to generate partial content.

The pre-rendering unit 500 may use information about a projection plane, required in a user's viewing direction, as PCC configuration information (PCC_config) based on user location information (user location) and viewpoint information (viewport, view point) in the user information (user Info.) in the partial content generation 503.

For example, when a 3D object is expressed by projecting the 3D object onto regular hexahedrons surrounding the 3D object, information about the 3D object may be expressed on a total of 6 planes (front, back, left, right, top, bottom). When the viewpoint of the user viewing the 3D object in the virtual space corresponds to a front plane part of a regular hexahedron, the pre-rendering unit 500 may transmit to the terminal, media information in which the object is projected onto the front plane, through the partial content generation 503.

The pre-rendering unit 500 may generate content including information about one or more planes according to a change of the viewpoint of the user. After the pre-rendering unit 500 generates content including information about each plane, the pre-rendering unit 500 may select and transmit content appropriate for the user's viewpoint through NBMP as the viewpoint of the user observing the object changes.

When the entire 6DoF content is re-converted into plane-specific content based on the user's viewpoint, the NBMP system may also update information of metadata related to a corresponding plane and transmit the updated information in the manifest form to the user terminal.

When the user terminal is capable of transmitting user feedback information to the 6DoF camera or server, the 6DoF camera or server may generate and transmit plane-specific partial content based on the user's viewpoint in generation of the 6DoF content. While it is assumed in the foregoing embodiment of the present disclosure that plane-specific partial content required for the user are transmitted, content around the plane, which are required depending on implementation, or content of a part where the user's viewpoint is expected to be changed may also be transmitted together.

According to another embodiment of the present disclosure, the NBMP system may configure plane-specific partial content based on the user's viewpoint with a plurality of streams. Media data of the 6DoF content may include a plurality of streams that are independently processible. In this case, the pre-rendering unit 500 may skip the geometric processing 501 and the rendering processing 502, and select media data appropriate for the user's viewpoint and transmit the selected media data to the terminal.

In the rendering of the 6DoF content, objects in the virtual space may be located according to an intention of a content manufacturer. When the 3D object in the virtual space is rendered, the object may be expressed in a location (rendering_reference_location) designated by the content manufacturer in the virtual space, and information about the location designated by the content manufacturer may be transmitted to the terminal or the network through content metadata.

The service user may view an object in user-selected location (userview_location) and direction (userview_direction) in the virtual space. Space information of the object and absolute location information of the object in the content may be transmitted through additional information expressing the object (e.g., scene description, etc.).

The scene description information may express additional information (color, location, brightness of light, etc.) regarding information of a 3D object in expression of the 3D object. For 3D content, the 3D object in the space may be expressed using the scene description information. The scene description information may include space information and location information. The scene description information may be transmitted as metadata.

The space information may include an overall size of a specific space and an absolute location of the object in the space to express a 3D space. For example, when an object is in a stadium, the location of the object to be expressed may change according to whether the range of the 3D space is limited to a space where players in the stadium have to play a game or is set to the entire stadium. Absolute location information of the object in the space may be used to express a location of the user (or the camera) or a location of the object.

Selection location information (userview_position, userview_direction) about a user selected location in the virtual space may be transmitted from the terminal to the media processing entity in the network through user feedback information. In pre-rendering of 6DoF content, the object may be expressed based on the selection location information.

In this case, when the object in the virtual space is rendered, an LoD expressing the object may vary with the user selected location. For example, when a person views an object within 1 m, a minimum resolution for identifying an image is 180 dpi, for an object within 3 m, the minimum resolution is 60 dpi, and for an object out of 15 m, the minimum resolution sharply decreases to 12 dpi.

Figure 5B:
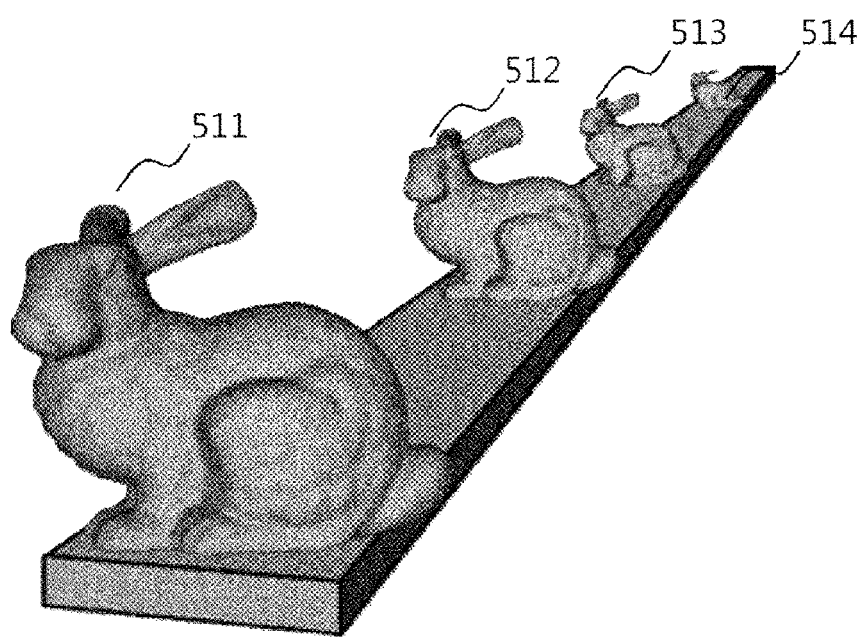
FIGS. 5B and 5C are views for describing that a level of details (LoD) expressing an object varies with a location of a user in a virtual space.

As illustrated in FIG. 5B, as a distance from the user selected location to the object in the virtual space increases, a minimum resolution at which the user may identify the object may decrease. As illustrated in FIG. 5B, a resolution of an object 511 closer from the user selected location has to be higher than a resolution of an object 514 far from the user selected location.

Figure 5C:
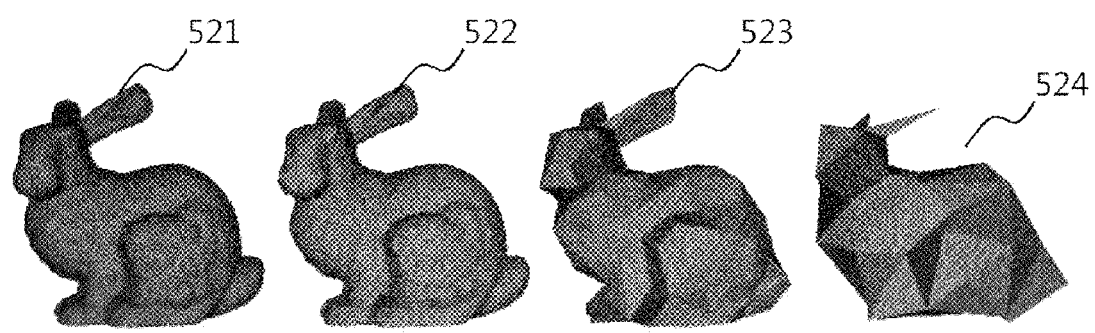

Thus, as illustrated in FIG. 5C, as the distance from the user selected location to the object increases (in a direction to the right), an LoD expressing the object may decrease.

Objects 511, 512, 513, and 514 having different distances from the user, illustrated in FIG. 5, may be expressed at different resolutions like images 521, 522, 523, and 524 illustrated in FIG. 55C. The object 511 of FIG. 5B may be expressed at the highest resolution as in the image 521 of FIG. 5C, and the object 512 of FIG. 5B may be expressed at a lower resolution as in the image 522 of FIG. 5C. The object 513 of FIG. 5B may be expressed at a lower resolution as in the image 523 of FIG. 5C, and the object 514 of FIG. 5B may be expressed at the lowest resolution as in the image 524 of FIG. 5C.

Figure 6:
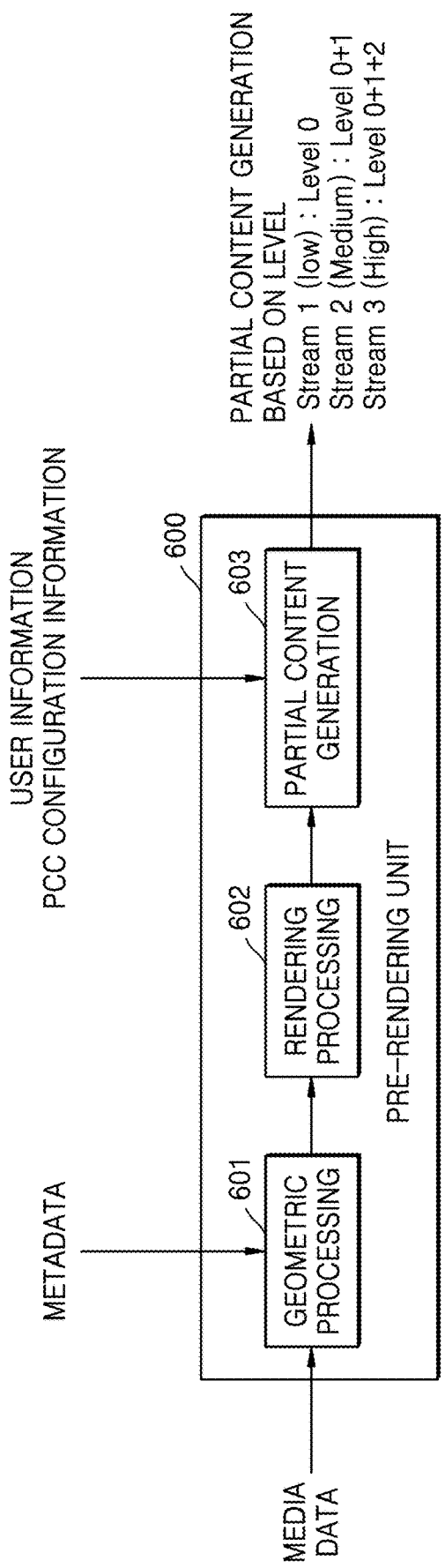
FIG. 6 illustrates an example for reconstructing 6DoF content with multiple streams based on a level using NBMP.
Figure 7:
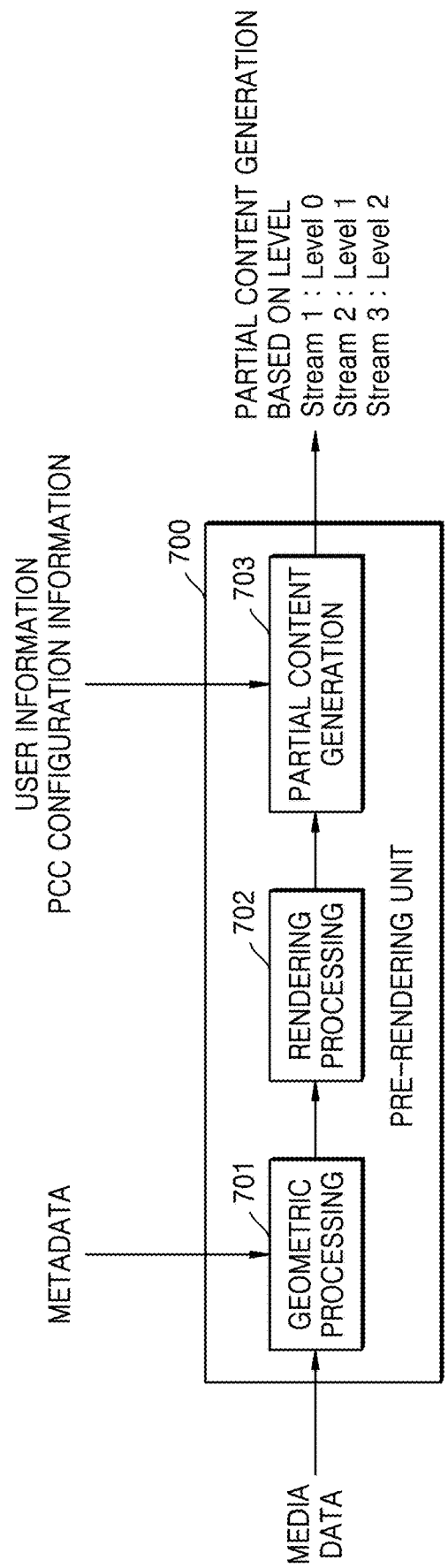
FIG. 7 illustrates an example for reconstructing 6DoF content with streams of different independent levels using NBMP.
Figure 8:
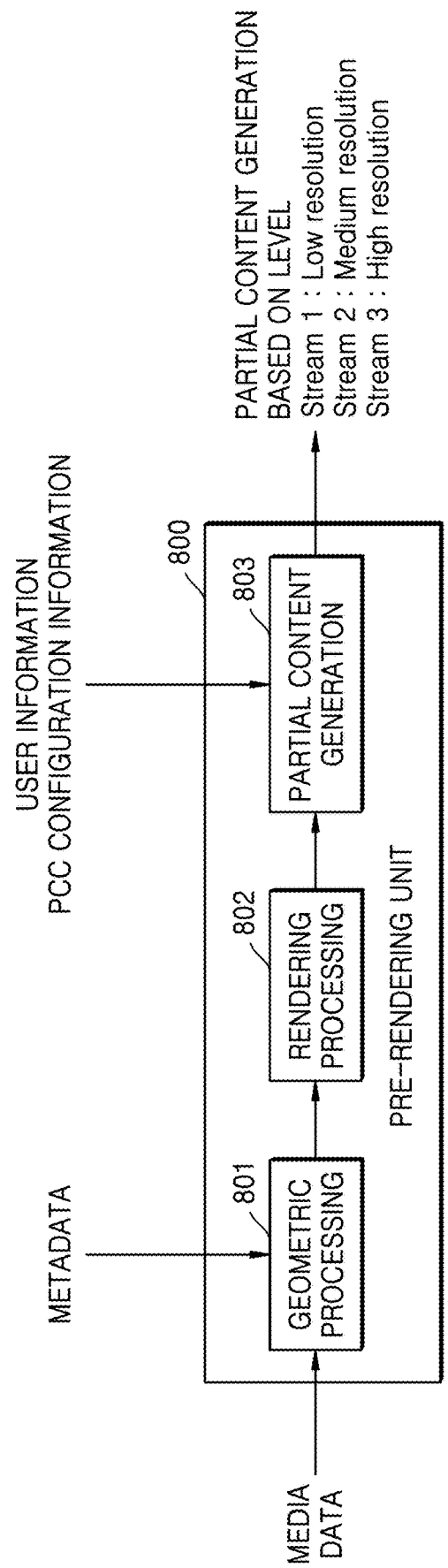
FIG. 8 illustrates an example for reconstructing 6DoF content with contents having different resolutions using NBMP.

FIGS. 6 through 8 illustrate examples where contents having different LoDs are re-generated according to user's views in rendering of 6DoF content in NBMP.

FIG. 6 illustrates an example where an NBMP entity reconstructs 6DoF content with multiple streams based on a level.

A pre-rendering unit 600 of FIG. 6 may correspond to the pre-rendering unit 222 of FIG. 2, and a redundant description will be avoided. As illustrated in FIG. 6, the pre-rendering unit 600 according to an embodiment of the present disclosure may re-generate 6DoF content by using a feature that an LoD of an object changes with a distance between a user selected location and the object.

For example, to express an object in a virtual space, by projecting the object to each plane of a regular hexahedron, information about the object is stored as projected images of 150×150 pixels. When the user views an object within 1 m from the user in the virtual space, the object may be expressed with 150×150 pixels. However, when the user views an object out of 15 m from the user in the virtual space, the object may be expressed at a low resolution of 15×15 pixels.

When the NBMP entity according to an embodiment of the present disclosure pre-renders 6DoF content, the NBMP entity may determine an LoD of an object by using user location information and view direction information and re-generate content based on the LoD of the object.

For example, the NBMP entity according to an embodiment of the present disclosure may re-generate the entire 6DoF content including 2D images of 150×150 pixels as content having details of three levels, based on a network environment and a user terminal environment. The entire 6DoF content may be re-generated as information of 50×50 pixels having details of Levels #0 through #2 through pre-rendering in the media processing entity. Information having details of Level #0 may include the most basic video information value (LoD #0_Fetch_video, LoD #0_Depth_video). The user terminal may render the object having the lowest resolution by using information having details of Level #0. Information of respective contents having different LoDs (e.g., fetch video and depth video) may be generated as one track or stream. It may be determined whether each stream or track is independently decodable according to a correlation between streams or tracks.

In FIG. 6, streams output by the NBMP entity according to an embodiment of the present disclosure may have a correlation. When 6DoF content configured in a PCC or binary form is transmitted, the NBMP entity may perform pre-rendering 600. Object data in the virtual space, which are generated through geometric processing 601 and rendering processing 602, may go through partial content generation 603 where the object data is re-generated as content including streams of contents of different levels.

The media processing entity that performs pre-rendering 600 illustrated in FIG. 6 may perform rendering on the entire data regarding the object through the geometric processing 601 and the rendering processing 602. The rendered data may go through the partial contents generation 603 to re-generate partial contents considering an LoD of an object corresponding to a user location based on user information and PCC configuration information.

The media processing entity that performs pre-rendering 600 illustrated in FIG. 6 may generate partial contents regarding some projection surface determined according to the user location. The media processing entity may generate and transmit content having a resolution corresponding to the user location by further considering the user location.

Streams of different levels generated through the partial contents generation 603 may have a correlation. As the streams of different levels are combined, the object may be expressed at a resolution determined by the user location.

For example, when the NBMP entity reconfigures data regarding one object into contents of three levels, contents of Level #0 may express the object by being independently decoded in the terminal. However, contents of Level #1 have a correlation with the contents of Level #0, such that it may not be possible to independently decode or render only the contents of Level #1. Contents of Level #2 may have a correlation with the contents of Level #0 and the contents of Level #1.

Thus, when a stream including partial contents that are pre-rendered according to a user location in the virtual space is transmitted to the user terminal, the user terminal may express the object at the lowest resolution by using information of the contents of Level #0.

When the object has to be expressed at a medium resolution according to the user location in the virtual space, the media processing entity may transmit the contents of Level #0 and the contents of Level #1 together to the user terminal through Stream #2. When a location where the user observes the object in the virtual space is within a short distance, the media processing entity may transmit the contents of Level #0, the contents of Level #1, and the contents of Level #2 together through Stream #3. The user terminal may express the object at the highest resolution based on the transmitted Stream #3.

FIG. 7 illustrates an example for reconstructing 6DoF contents with streams of different independent levels using NBMP.

A pre-rendering unit 700 of FIG. 7 may correspond to the pre-rendering unit 222 of FIG. 2, and a redundant description will be avoided. When 6DoF contents configured in a PCC or binary form are transmitted, the NBMP entity may perform pre-rendering 700. Object data in the virtual space, which are generated through geometric processing 701 and rendering processing 702, may go through partial contents generation 703 where the object data is re-generated as contents including streams of contents of different levels.

The NBMP entity according to an embodiment of the present disclosure may express an object at a low resolution as a distance between the user and the object increases based on the user location in the virtual space. By using such a feature, the NBMP entity may regenerate the entire 6DoF contents with contents of three independent levels (Level #0 through #2). In this case, the terminal may express the object at the lowest resolution by using information of Stream #1 (Level #0).

The terminal may receive Stream #1 (Level #0) and Stream #2 (Level #1) according to the user location in the virtual space and combine media data (points, RGB color information, etc.) of the respective streams to express the object at a medium resolution. To express the object at the highest resolution, the terminal may receive Streams (or tracks) #1 through #3 (contents of Level #0 through #2) and combine media data information of the respective streams to express the object at the highest resolution.

FIG. 8 illustrates an example for reconstructing 6DoF contents with contents having different resolutions using NBMP.

A pre-rendering unit 800 of FIG. 8 may correspond to the pre-rendering unit 222 of FIG. 2, and a redundant description will be avoided. When 6DoF contents configured in a PCC or binary form are transmitted, the NBMP entity may perform pre-rendering 800. Object data in the virtual space, which are generated through geometric processing 801 and rendering processing 802, may go through partial contents generation 803 where the object data is re-generated as contents expressing the object at different resolutions according to the user location.

In this case, the media processing entity may express the object at various resolutions determined by a distance from a random user location to the object within a location range where the user may move in the virtual space. The media processing entity may express the object at a high resolution in which the object looks clear as the distance between the user and the object decreases in the virtual space, and may express the object at a low resolution in which the object looks dim as the distance increases.

The media processing entity may express the object at various LoDs determined by the distance between the user and the object in the virtual space. The media processing entity may determine based on the distance between the user and the object with how many points the object is to be expressed and at which level of color details the object is to be rendered on the display.

For example, when one object is expressed at three resolutions, the media processing entity may generate three streams: Stream (or track) #1 having a low resolution, Stream (or track) #2 having a medium resolution, and Stream (or track) #3 having a high resolution. The media processing entity may generate three streams having different resolutions and then transmit to the terminal, at least one stream corresponding to a resolution determined according to the location of the user observing the object in the virtual space.

Figure 9:
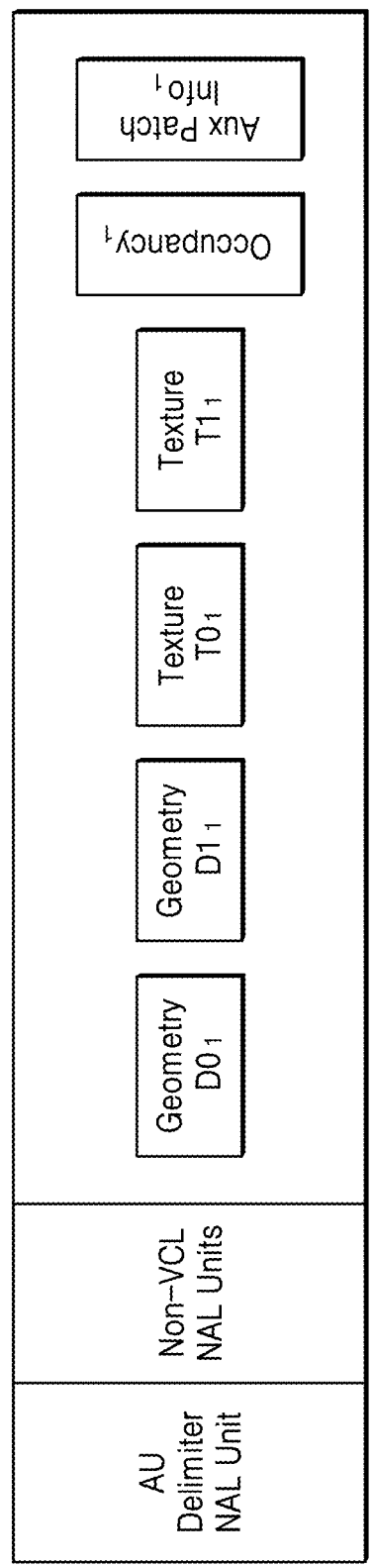
FIG. 9 illustrates an example of a format for storing and transmitting information about a three-dimensional (3D) object in an NBMP system, according to an embodiment of the present disclosure.

FIG. 9 illustrates an example of a format for storing and transmitting information about a 3D object in an NBMP system, according to an embodiment of the present disclosure. As described above, point cloud data may include geometry video and texture video and metadata, and the metadata may include at least one of an occupancy map or auxiliary patch info. FIG. 9 illustrates an example of an access unit that is a data set for expressing an object at a time t. The time t may mean a time at which files (e.g., geometry information and texture information) expressing the object are stored and a time at which the files are expressed.

Data forming the access unit illustrated in FIG. 9 may include network abstract layer (NAL) units. An AU delimiter NAL unit corresponding to a header in an NAL unit may include configuration information regarding the entire access unit, and a non-video coding layer (VCL) NAL unit may include information required for processing subsequent media data (VCL NAL units). The VCL NAL units may include real media data, the media data may include geometry video, texture video, and metadata, and the metadata may include at least one of an occupancy map or auxiliary patch information.

In the embodiment of FIG. 9, the media processing entity is assumed to multiplex a plurality of media data pieces forming a point cloud into one data piece in an NAL unit stage. However, an embodiment of the present disclosure is not limited to the illustration, and multiplexing may be performed over several stages of a protocol stack for transmitting a service.

For example, the geometry video, the texture video, and the metadata may be inserted into and transmitted in different files, or may be inserted a separate track (or sub-track) and transmitted in one file. When the plurality of media data pieces forming the point cloud are inserted into and transmitted in separate files or are inserted into separate tracks and transmitted in one file, information corresponding to the AU delimiter NAL unit and the non-VCL NAL unit of FIG. 9 may be transmitted as a part of the file or may be separately transmitted in a signaling form.

As described above, the NBMP entity according to an embodiment of the present disclosure may re-generate 6DoF contents regarding an object into a plurality of streams having different LoDs by considering a network environment (Network_Bandwidth), user information, or a state of a user terminal (Device_Cap_Buffersize), thereby transmitting partial stream information or the entire stream information. Alternatively, the NBMP entity according to an embodiment of the present disclosure may selectively transmit contents corresponding to user location information based on the user location information, by considering the network environment or the state of the user terminal.

Figure 10:
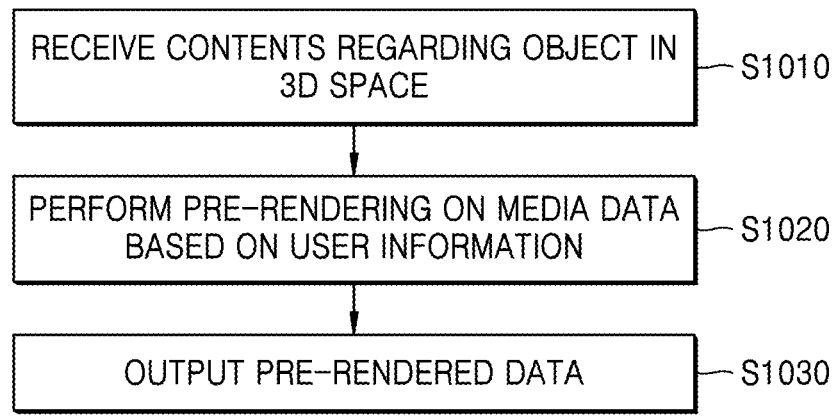
FIG. 10 is a flowchart of a method of processing content, according to an embodiment of the present disclosure.

FIG. 10 is a flowchart of a method, performed by a device for processing contents, of processing contents, according to an embodiment of the present disclosure. The device for processing contents may include at least some configurations of the NBMP system illustrated in FIGS. 1 through 7. For example, the device for processing contents may be a media processing entity of the NBMP system.

In operation S1010, the device for processing contents according to an embodiment of the present disclosure may receive contents regarding an object in a 3D space. The contents may be 6DoF contents. The device for processing contents according to an embodiment of the present disclosure may receive contents from a camera or server. The device for processing contents according to an embodiment of the present disclosure may separate the received contents into media data and metadata.

In operation S1020, the device for processing contents according to an embodiment of the present disclosure may perform pre-rendering on the media data based on user information.

The device for processing contents may perform geometric processing for expressing an object in a virtual space on the media data based on the metadata. The device for processing contents may provide 2D contents or partial 3D contents by performing rendering on data resulting from the geometric processing, based on the user information. For example, the device for processing contents may provide 2D contents or partial 3D contents corresponding to a user's view by performing rendering on the media data.

The device for processing contents may receive the user information from a user terminal before performing pre-rendering. The user information may include at least one of user location information, user view information, network environment information, or user terminal state information. The user information may be transmitted in the form of metadata regarding a service user to the device for processing contents from the user terminal device.

The device for processing contents may perform rendering on the media data according to an LoD of the object, determined based on the user location. For example, the device for processing contents may generate a plurality of streams having different LoDs for the object, based on the media data. The device for processing contents may re-generate contents to include at least one of the plurality of streams, based on the user location.

The device for processing content may perform rendering on the media data based on the user location, such that a resolution of the object decreases as a distance between the user and the object increases.

In operation S1030, the device for processing content according to an embodiment of the present disclosure may output pre-rendered data.

For example, as described above with reference to FIG. 5A, the device for processing content may extract and transmit information about a projection plane corresponding to the user view.

In another example, as described above with reference to FIG. 6, the device for processing content may output streams of different levels, which have a correlation, as the pre-rendered data. In this case, as the streams of different levels are combined and transmitted, the object may be expressed at a resolution determined by the user location.

In another example, as described above with reference to FIG. 7, the device for processing content may output independent streams of different levels as the pre-rendered data. In this case, the terminal may express the object at a resolution corresponding to the user location in the virtual space by combining media data information of the respective streams.

In another example, as described above with reference to FIG. 8, the device for processing content may output contents having different resolutions as the pre-rendered data. The device for processing content may generate three streams having different resolutions and then transmit to the terminal, a stream corresponding to a resolution determined according to the location of the user observing the object in the virtual space.

All or some of blocks illustrated in FIGS. 1 through 10 may be implemented with hardware and/or software components which perform specific functions. The functions performed by the blocks illustrated in FIGS. 1 through 10 may be implemented by at least one microprocessor or circuit configurations for a corresponding function. All or some of the blocks illustrated in FIGS. 1 through 10 may include software modules configured with various programming languages or script languages executed in a processor.

Meanwhile, the foregoing embodiment may be written as a program executable on computers, and may be implemented on a general-purpose digital computer operating the program by using a computer-readable recording medium. In addition, a structure of data used in the foregoing embodiment may be recorded on a computer-readable recording medium using various means. Moreover, the foregoing embodiment may be implemented with a recording medium including a computer-executable command such as a computer-executable programming module. For example, methods implemented with a software module or algorithm may be stored in a computer-readable recording medium as codes or program commands that are readable and executable by computers.

The computer-readable medium may be an arbitrary recording medium that is accessible by a computer, and may include all of a volatile medium, a non-volatile medium, a separated medium, and a non-separated medium. The computer-readable medium may include, but not limited to, a storage medium, for example, a magnetic storage medium such as a read-only memory (ROM), a floppy disk, a hard disk, etc., an optical reading medium such as a compact-disc (CD)-ROM, a digital versatile disc (DVD), etc. The computer-readable medium may also include both a computer storage medium and a communication medium.

Moreover, a plurality of computer-readable recording media may be distributed over network-connected computer systems, and data, for example, program instructions and codes, stored in the distributed recording media, may be executed by at least one computer.

The particular implementations described in the present disclosure are illustrative examples and are not intended to otherwise limit the scope of the present disclosure in any way. For the sake of brevity, conventional electronics, control systems, software development and other functional aspects of the systems may not be described in detail.

The invention claimed is:

1. A method of processing content, the method comprising:
   receiving content regarding an object in a three-dimensional (3D) space, the content comprising media data and metadata;
   performing pre-rendering on the media data based on user information; and
   transmitting the pre-rendered data to a user device,
   wherein the user information comprises information on a user location in the 3D space, and
   wherein the performing of the pre-rendering comprises performing rendering on the media data according to a level of detail (LoD) of the object, determined based on a distance from the user location to the object.

2. The method of claim 1,
   wherein the content comprises 6 degrees of freedom (6DoF) content, the 6DoF of the content comprising information of a surge motion, information of a sway motion, and information of a translational motion, and
   wherein the method is implemented based on network-based media processing (NBMP).

3. The method of claim 1, wherein the performing of the pre-rendering further comprises:
   performing geometric processing for expressing the object with respect to the media data, based on the metadata; and
   providing two-dimensional (2D) content or partial 3D content by performing rendering on data resulting from the geometric processing, based on the user information.

4. The method of claim 1, wherein the performing of the pre-rendering further comprises providing two dimensional (2D) content or partial 3D content corresponding to a user's view by performing rendering on the media data.

5. The method of claim 1, further comprising:
   receiving the user information from the user device, wherein the user information further comprises at least one of user view information, network environment information, or state information of the user device.

6. The method of claim 1, wherein the performing of the pre-rendering further comprises:
   generating a plurality of streams having different level of demands (LoDs) for the object, based on the media data; and
   re-generating content to include at least one of the plurality of streams, based on the distance from the user location to the object in the 3D space.

7. The method of claim 1, wherein the performing of the pre-rendering further comprises performing rendering on the media data based on the distance from the user location to the object in the 3D space, such that a resolution of the object decreases as the distance increases.

8. A device for processing content, which processes the content and transmits the processed content to a user device, the device comprising:
at least one processor configured to:
receive content regarding an object in a three-dimensional (3D) space, the content comprising media data and metadata,
perform pre-rendering on the media data based on user information, and
transmit the pre-rendered data to the user device,
wherein the user information comprises information on a user location in the 3D space, and
wherein the at least one processor is further configured to perform rendering on the media data according to a level of detail (LoD) of the object, determined based on a distance from the user location to the object.

9. The device of claim 8,
wherein the content comprises 6 degrees of freedom (6DoF) content, the 6DoF of the content comprising information of a surge motion, information of a sway motion, and information of a translational motion, and
wherein the at least one processor uses network-based media processing (NBMP).

10. The device of claim 8, wherein the at least one processor is further configured to:
perform geometric processing for expressing the object with respect to the media data, based on the metadata, and
provide two-dimensional (2D) content or partial 3D content by performing rendering on data resulting from the geometric processing, based on the user information.

11. The device of claim 8, wherein the at least one processor is further configured to provide two-dimensional (2D) content or partial 3D content corresponding to a user's view by performing rendering on the media data.

12. The device of claim 8,
wherein the at least one processor is further configured to receive the user information from the user device, and
wherein the user information further comprises at least one of user view information, network environment information, or state information of the user device.

13. The device of claim 8, wherein the at least one processor is further configured to:
generate a plurality of streams having different level of details (LoDs) for the object, based on the media data, and
re-generate content to include at least one of the plurality of streams, based on the distance from the user location to the object in the 3D space.

14. The device of claim 8, wherein the at least one processor is further configured to perform rendering on the media data based on the distance from the user location to the object in the 3D space, such that a resolution of the object decreases as the distance increases.

* * * * *